(12) United States Patent
Graumann (10) Patent No.: US 9,965,169 B2
(45) Date of Patent: May 8, 2018

(54) SYSTEMS, METHODS, AND APPARATUS FOR CONTROLLING GESTURE INITIATION AND TERMINATION (76) Inventor: David L. Graumann, Portland, OR (US)

( * ) Notice: Subject to any disclaimer, the term of this patent is extended or adjusted under 35 U.S.C. 154(b) by 162 days.

(21) Appl. No.: 13/977,591

(22) PCT Filed: Dec. 29, 2011

(86) PCT No.: PCT/US2011/067837
§ 371 (c)(1),
(2), (4) Date: Apr. 3, 2014

(87) PCT Pub. No.: WO2013/101058
PCT Pub. Date: Jul. 4, 2013

(65) Prior Publication Data
US 2014/0223384 A1 Aug. 7, 2014

(51) Int. Cl.
*G06F 3/0488* (2013.01)
*B60W 50/08* (2012.01)
(Continued)

(52) U.S. Cl.
CPC .......... *G06F 3/04883* (2013.01); *B60K 28/02* (2013.01); *B60K 28/066* (2013.01);
(Continued)

(58) Field of Classification Search
CPC ...... G06F 3/04883; G06F 3/012; G06F 3/005; G06F 3/017; G06F 3/023; G06F 3/0304;
(Continued)

(56) References Cited

U.S. PATENT DOCUMENTS

| 6,198,485 B1 | 3/2001 | Mack et al. |
| 2004/0068409 A1* | 4/2004 | Tanaka ................ B25J 9/1656 704/272 |

(Continued)

FOREIGN PATENT DOCUMENTS

| EP | 2367140 | 11/2011 |
| JP | 2009-248629 A | 10/2009 |

(Continued)

OTHER PUBLICATIONS

Ishikawa et al., JP 2009-248629, Oct. 29, 2009 (Machine Translation).*

(Continued)

*Primary Examiner* — Courtney D Heinle
(74) *Attorney, Agent, or Firm* — Eversheds Sutherland (US) LLP (57) ABSTRACT Certain embodiments of the invention may include systems, methods, and apparatus for controlling gesture initiation and termination of a user and controlling devices based on a user's gestures. According to one embodiment, a vehicle can include at least one actuator; at least one gesture detection device; and one or more processors. The one or more processors receive an initiation indication from the at least one actuator; receive gesture information from the at least one gesture detection device; receive a termination indication from the at least one actuator; determine, from the received gesture information, a gesture from at least one occupant of the vehicle, wherein the gesture is determined based at least in part on the initiation indication; select a command from a plurality of commands, based at least in part on the determined gesture; and output a control signal or a command control signal associated with the command.

30 Claims, 5 Drawing Sheets

(51) Int. Cl.
*B60K 28/02* (2006.01)
*B60K 28/06* (2006.01)
*G06F 3/01* (2006.01)
*G06F 3/00* (2006.01)
*G06F 3/023* (2006.01)
*G06F 3/03* (2006.01)
*B60K 37/06* (2006.01)

(52) U.S. Cl.
CPC ............ *B60K 37/06* (2013.01); *B60W 50/08* (2013.01); *G06F 3/005* (2013.01); *G06F 3/012* (2013.01); *G06F 3/017* (2013.01); *G06F 3/023* (2013.01); *G06F 3/0304* (2013.01); *B60K 2350/104* (2013.01); *B60K 2350/1052* (2013.01); *B60K 2350/2013* (2013.01); *B60W 2540/22* (2013.01)

(58) Field of Classification Search
CPC ... B60W 50/08; B60W 2540/22; B60K 28/02; B60K 28/066; B60K 37/06; B60K 2350/1052; B60K 2350/104; B60K 2350/2013
USPC .......................................................... 701/36
See application file for complete search history.

(56) References Cited

U.S. PATENT DOCUMENTS

| | | | |
|---|---|---|---|
| 2008/0065291 A1 | 3/2008 | Breed | |
| 2009/0278915 A1* | 11/2009 | Kramer | G06K 9/00375 348/48 |
| 2009/0284552 A1* | 11/2009 | Larson | G02B 27/01 345/632 |
| 2009/0327977 A1* | 12/2009 | Bachfischer | B60K 35/00 715/863 |
| 2010/0052931 A1* | 3/2010 | Kolpasky | B60R 25/00 340/670 |
| 2010/0169781 A1* | 7/2010 | Graumann | G06F 3/011 715/727 |
| 2010/0245131 A1* | 9/2010 | Graumann | G01P 15/00 341/20 |
| 2011/0222726 A1* | 9/2011 | Ruan | G06K 9/00355 382/103 |
| 2011/0286676 A1* | 11/2011 | El Dokor | G06F 3/017 382/225 |
| 2013/0024071 A1* | 1/2013 | Sivertsen | B60K 35/00 701/41 |
| 2013/0076615 A1* | 3/2013 | Iao | G06F 3/017 345/156 |
| 2013/0278504 A1* | 10/2013 | Tong | G06F 3/017 345/158 |
| 2014/0222253 A1* | 8/2014 | Siegel | B60R 16/037 701/2 |

FOREIGN PATENT DOCUMENTS

| | | |
|---|---|---|
| JP | 2009248629 A | 10/2009 |
| JP | 2010-184600 A | 8/2010 |
| JP | 2010184600 A | 8/2010 |
| WO | 2013/063767 | 5/2013 |
| WO | 2013/101058 A1 | 7/2013 |

OTHER PUBLICATIONS

Extended European Search Report for European Patent Application 11879089.8 dated Aug. 17, 2015. 6 Pages.
International Preliminary Report on Patentability and Written Opinion received for PCT Patent Application No. PCT/US2011/067837, dated Jul. 10, 2014, 7 Pages.
International Search Report and Written Opinion received for PCT Application No. PCT/US2011/067837, dated Sep. 21, 2012, 11 pages.
International Search Report received in PCT/US2011/067837; dated Sep. 21, 2012; 4 pages.
Chinese Office Action received in CN 201180076039.6; dated Jan. 4, 2016, 22 pages.
2nd Office Action for Chinese Patent Application No. 201180076039.6, dated Sep. 18, 2016, (20 pg English translation).

* cited by examiner

SYSTEMS, METHODS, AND APPARATUS FOR CONTROLLING GESTURE INITIATION AND TERMINATION

FIELD OF THE INVENTION

This invention generally relates to controlling devices in vehicles, and in particular, to controlling gesture initiation and termination by a user in a vehicle and controlling devices in the vehicle based on the user's gestures.

BACKGROUND OF THE INVENTION

It has been estimated that between 25 and 50 percent of all motor vehicle crashes in the United States are caused, at least in part, by driver distractions. Common driver distractions include dialing or talking on a cell phone, sending text messages, reaching for an object inside the vehicle, looking at an object or event outside of the vehicle, or looking away from the road to read displays, books, or maps.

Many objects, or situations associated with a moving vehicle can be detected when the driver concentrates on the road ahead while intermittently glancing at side and rearview mirrors. However, when a driver looks down or to the side for more than just a brief moment, the resulting blind spots or limited peripheral vision can create safety issues for the driver, passengers, and surrounding pedestrians and motorists.

BRIEF DESCRIPTION OF THE FIGURES

Reference will now be made to the accompanying figures and flow diagrams, which are not necessarily drawn to scale, and wherein.

DETAILED DESCRIPTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is understood that embodiments of the invention may be practiced without these specific details. In other instances, well-known methods, structures, and techniques have not been shown in detail in order not to obscure an understanding of this description. References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the term "vehicle" can include a passenger car, a truck, a bus, a freight train, a semi-trailer, an aircraft, a boat, a motorcycle, or any other motorized vehicle that can be used for transportation. As used herein, unless otherwise specified, the use of the term "occupant" can include a driver or passenger in a vehicle. As used herein, unless otherwise specified, the use of the term "gesture" can mean a movement, sound, or other indication that an occupant can initiate.

Certain embodiments of the invention may enable control of devices based on one or more detected and stored gestures. For example, a gesture control device may be used in a vehicle to sense or detect when a driver initiates a gesture initiation indication. Upon detection of the gesture initiation indication, one or more gestures by the driver can be detected by an associated gesture detection device. According to an example embodiment, one or more functions related to devices associated with the vehicle may be triggered or controlled by one or more gestures. According to example embodiments of the invention, devices that may be controlled by one or more gestures include vehicle displays, sound systems, navigation systems, collision avoidance systems, alerting systems, braking systems, or any other control related to a vehicle.

Example embodiments may detect one or more gestures and use the gesture information to replace actions that may otherwise require an additional movement or interaction. For example, instead of reaching out to adjust a specific vehicle control or touch a specific vehicle control button, a driver may simply gesture in front of a gesture detection device, such as a camera, associated with the vehicle to trigger a function. According to another example, a driver may manipulate a gesture control device, such as pushing a gesture control button, to initiate a gesture initiation indication, and then the driver may perform one or more gestures to be detected by a gesture detection device, such as a camera, associated with the vehicle. In some embodiments, a driver may further manipulate the gesture control device, such as releasing the gesture control button, to indicate a gesture termination indication to indicate an end to the one or more gestures performed towards the camera. In any instance, the vehicle may perform one or more corresponding inputs or commands associated with the detected one or more gestures.

According to an example embodiment of the invention, a driver can use a gesture control button to initiate detection of one or more gestures by a gesture detection device and store the gestures and associated inputs or commands for subsequent retrieval. When retrieved, the stored gestures can be compared and matched to currently observed gestures, and the associated inputs or commands can be implemented to control one or more vehicle controls.

Various systems may be utilized for controlling gesture initiation and termination and controlling devices based on detected user gestures, according to example embodiments of the invention, and will now be described with reference to the accompanying figures.

Figure 1:
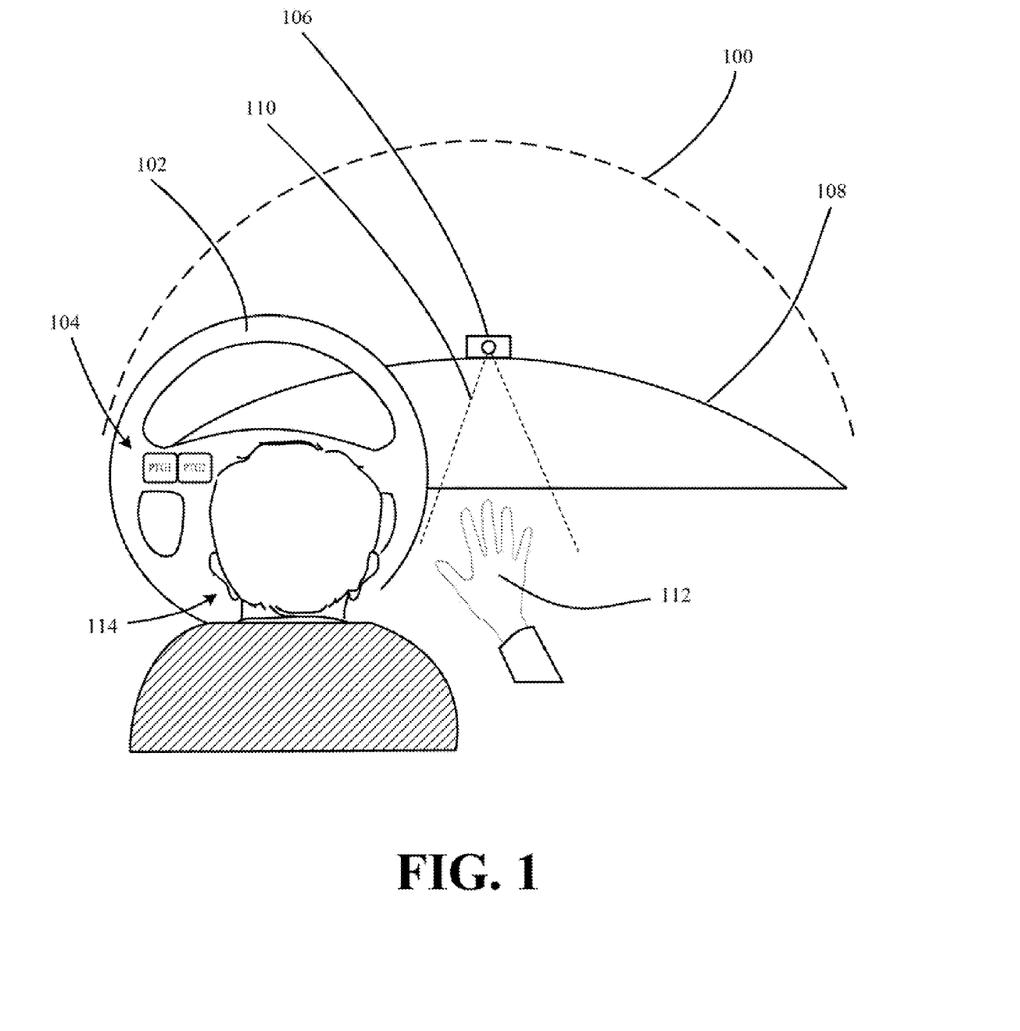
FIG. 1 shows an illustrative gesture control arrangement with a vehicle occupant gesturing towards a gesture detection device associated with a vehicle, according to an example embodiment of the invention.

FIG. 1 depicts an illustrative gesture control arrangement 100 inside a vehicle, according to an example embodiment.

In the embodiment shown in FIG. 1, a steering column 102 or wheel can include one or more gesture control devices 104, for example, two buttons mounted on the left side of the steering column 102. Further, a gesture detection device 106, for instance, a camera, may be mounted to (or embedded in) the vehicle. For example, the gesture detection device 106 may be attached to vehicle console 108. The gesture detection device 106 may have a field-of-view (FOV) 110 that includes at least one hand 112, such as the right hand, of a vehicle occupant 114. The gesture detection device 106 may be configured to capture one or more images of the right hand 112 of the occupant 114, and the images may be processed to determine one or more hand features associated with the hand 112 of the occupant 114. One or more of the hand features can correspond to one or more respective inputs or commands, which can be implemented by a controller or computer processor associated with the vehicle described below in FIG. 4. For example, one or more hand features may include hand and/or finger movements and/or positions mimicking the hand and/or finger movements and/or positions used to accomplish a particular vehicle function. In another example, one or more hand features may include previously stored hand and/or finger movements and/or positions that correspond to an associated input or command for controlling a function associated with a vehicle.

Thus, the vehicle occupant 114 can use his or her left hand to manipulate the one or more gesture control devices 104 on the left side of the steering column 102, and use his or her right hand to gesture in view of the gesture detection device 106. In this manner, a vehicle occupant, particularly a driver, can maintain control of the vehicle as well as his or her view in the area ahead of or around the vehicle while being able to provide an input or command to control a function associated with the vehicle via the one or more gesture control devices 104 and one or more gesture detection devices 106.

One will recognize that other embodiments of the invention are not limited to vehicles with steering columns. Embodiments of the invention utilizing one or more gesture control devices with one or more gesture detection devices can exist in other types of vehicles where vehicle occupants desire to initiate and/or terminate gesture inputs for controlling functionality associated with the vehicle.

Figure 2:
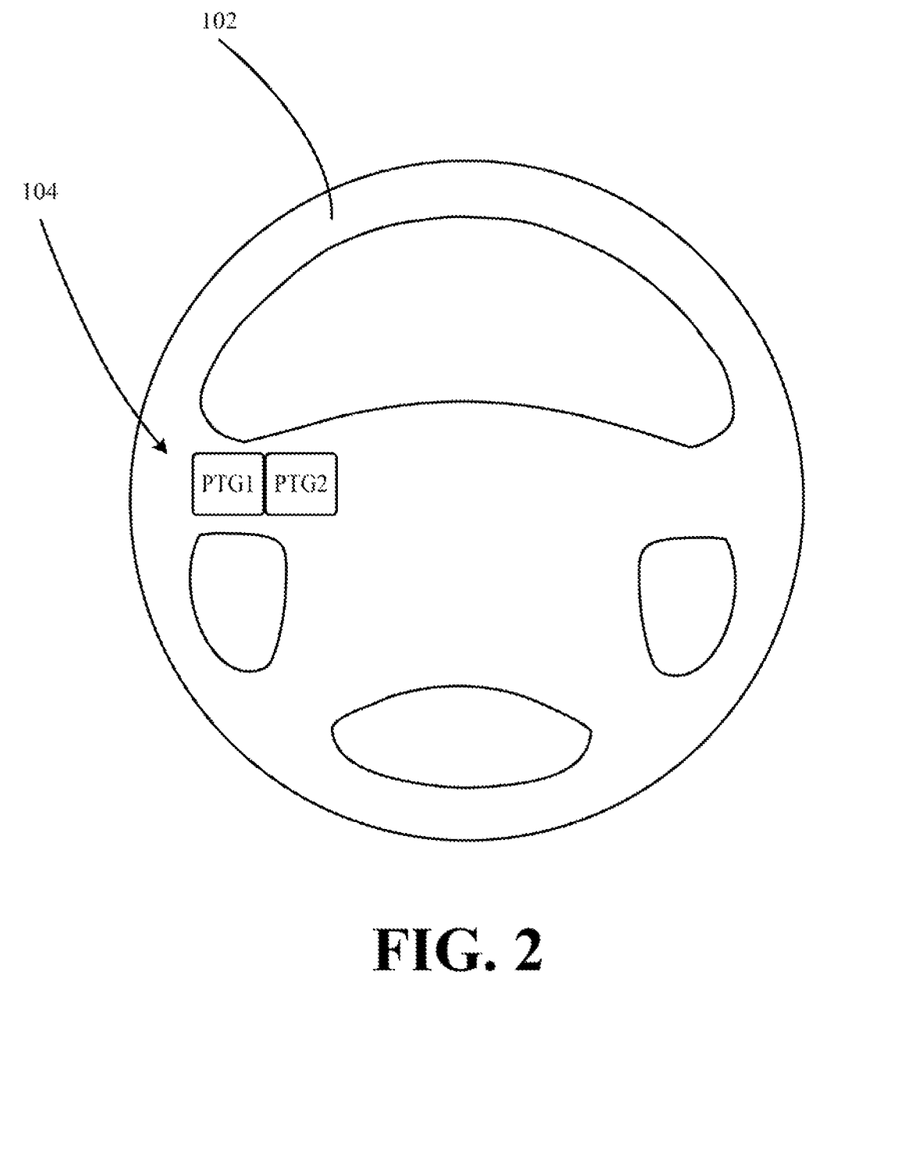
FIG. 2 depicts an illustrative gesture control device for a steering column in a vehicle, according to an example embodiment of the invention.

Another view of the illustrative gesture control arrangement 100 of FIG. 1 is depicted in FIG. 2, but with an unobstructed view of the steering column 102 with the one or more gesture control devices 104. According to an example embodiment of the invention, the one or more gesture control devices (for example 104 of FIGS. 1 and 2) may receive one or more driver inputs to initiate and/or terminate gesture input. Typically, the one or more gesture control devices are associated with respective actuators, which may be mechanically and/or electrically connected to the one or inure gesture control devices. In any instance, the respective actuators can translate and communicate one or more inputs via the one or more gesture control devices to an associated controller or computer processor, shown in FIG. 4. One of the problems of conventional gesture control of a machine is the inability to reliably determine the starting and ending location of a series of human gestures to control the machine, in the embodiment shown in FIGS. 1 and 2, a driver using the one or more gesture control devices, such as 104, can indicate an initiation indication or start point for one or more gestures to control the vehicle as well as a termination indication or end point for the one or more gestures. In this example, two buttons can function as gesture control devices 104, but in other embodiments other types of gesture control devices can be used. Further, in other embodiments, fewer or greater numbers of gesture control devices and/or buttons can exist.

In one embodiment, for example, a vehicle occupant may use his or her left hand to manipulate a gesture control device 104, such as pressing a button, to indicate the initiation of or start point of one or more gestures performed by the occupant's right hand. The occupant can then gesture with his or her right hand towards the gesture detection device 106 and make one or more hand gestures to be captured by the gesture detection device 106. When the occupant has finished the one or more hand gestures with his or her right hand, the occupant can manipulate the gesture control device 104, such as releasing the button, to indicate the termination of or end point of the one or more gestures. The termination indication from the vehicle occupant can provide an indicator to the gesture detection device 106 to cease capturing any further gestures from the occupant, and to implement one or more inputs or commands associated with the gestures. In this example, manipulation of the gesture control device 104 by the vehicle occupant, i.e., pressing the button and releasing the button after a series of one or more gestures is completed, can provide duration information, liming information, segment information, and an indication of "on" and "off" for the desired functionality associated with the vehicle.

In another embodiment, after a vehicle occupant indicates the initiation of or start point of one or more gestures and begins making gestures to be captured by a gesture detection device 106, the vehicle occupant may decide to cease making gestures prior to the end of a series of gestures, and indicate termination of or an end point of the one or more gestures. For example, a vehicle occupant may be using his or her left hand to manipulate a gesture control device 104, such as pressing a button, to indicate the initiation of or start point of one or more gestures performed by the occupant's right hand. After making one or more gestures with his or her right hand towards the gesture detection device 106, the occupant may decide to cease making gestures prior to the end of a series of gestures. In this case, the occupant can manipulate the gesture control device 104, such as releasing the button, to indicate the termination of or end point of the one or more gestures. The termination indication from the vehicle occupant can provide an indicator to the gesture detection device 106 to cease further processing of any captured gestures from the occupant, and thus stop any or further implementation of the one or more inputs or commands associated with the gestures. In this manner, manipulation of the gesture control device 104 by the vehicle occupant, i.e., pressing the button and releasing the button before the end of a series of one or more gestures, can provide a "cutoff" indication for implementing desired functionality associated with the vehicle. For example, if a particular gesture to open the sunroof is initiated by a vehicle occupant, the vehicle occupant can cease the operation prior to its execution by releasing the button, or if the sunroof is already partially open, the vehicle occupant can cease further opening of the sunroof by releasing the button.

Figure 4:
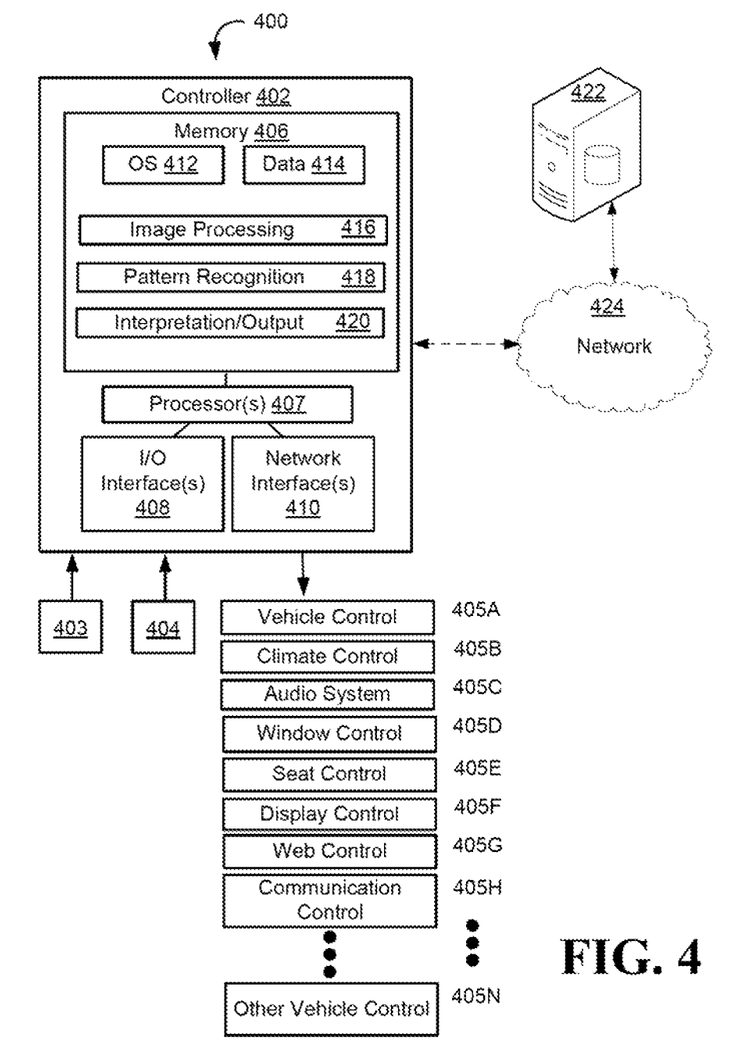
FIG. 4 is a block diagram of an illustrative gesture control system, according to an example embodiment of the invention.

In one embodiment, manipulation of the gesture control device 104, for example, pressing a button and releasing the button, may not directly activate a gesture detection device 106 or camera. In certain instances, the gesture detection device 106 may continuously capture images within a field-of-view 110, or may only capture images when an object, such as a hand, enters the field-of-view 110. In some instances, there may be one or more hand gestures towards the gesture detection device 106 that may precede manipulation of the gesture control device 104 indicating initiation of one or more hand gestures to be captured. Likewise, there may be one or more hand gestures towards the gesture detection device 106 that may follow manipulation of the gesture control device indicating termination of one or more hand gestures to be captured. In either case, the gesture control arrangement 100 can capture one or more hand gestures intended to be directed towards the gesture detection device 106 but for which the gesture control device, such as 104, is not being concurrently or simultaneously manipulated by the vehicle occupant. To capture these one or more hand gestures by the vehicle occupant, the gesture control arrangement 100 and associated controller or computer processor, such as shown in FIG. 4, may process the one or more hand gestures in a brief predefined time, for instance, about 500 milliseconds or another time period, prior to and/or after manipulation of the gesture control device 104.

Figure 3A:
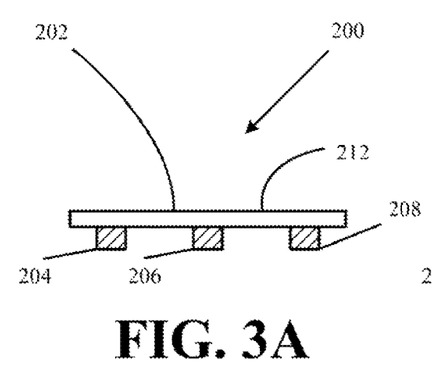
FIGS. 3A-3E show illustrative orientations for another example gesture control device, according to an example embodiment of the invention.
Figure 3B:
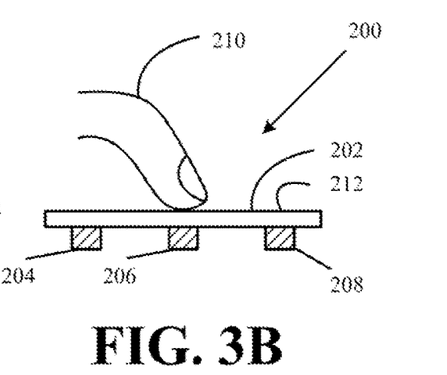

In another embodiment, a gesture control device can be a rocker switch, for example, 200 as depicted in FIGS. 3A-3E. A rocker switch 200 can include a relatively large panel 202 or button with multiple actuators 204, 206, 208 in mechanical and/or electrical communication with the panel 202 or button. In any instance, the actuators can translate and communicate one or more inputs via the rocker switch 200 to an associated controller or computer processor, shown in FIG. 4. In this example, a vehicle occupant can manipulate the rocker switch 200 with his or her finger 210 to actuate one or more of the actuators 204, 206, 208. Each of the positions of the rocker switch 200 can correspond to respective inputs or commands from the vehicle occupant. In FIGS. 3A-3E, detailed side views of different positions for an example rocker switch 200 are shown. In FIG. 3A, the rocker switch 200 shown is in a non-actuated position with at least three actuators 204, 206, 208 positioned beneath the button 200. Each of the actuators 204, 206, 208 can be operatively connected to the rocker switch 200, and may individually or collectively be actuated by pressure or contact applied to the rocker switch 200 at particular areas on the rocker switch 200. As shown in the following FIGS. 3B-3E, a vehicle occupant's finger 210 can be positioned at various positions on a surface 212 of the rocker switch 200 to manipulate the rocker switch 200 as desired. In FIG. 3B, the vehicle occupant's finger 210 can contact the outer surface 212 of the rocker switch 200, shown here in a non-actuated position.

In one embodiment, a gesture control device, such as a touch pad, may detect or otherwise sense contact by or presence of a vehicle occupant's finger at or near an outer surface of the gesture control device. In that embodiment, the contact by or presence of the vehicle occupant's finger can manipulate one or more actuators positioned beneath or otherwise associated with the gesture control device. One will recognize that any number of technologies can be used to detect or otherwise sense contact by or presence of a vehicle occupant's finger at or near an outer surface of a gesture control device.

In one embodiment, at least one actuator can include, but is not limited to, a touch sensitive switch, a toggle switch, a momentary switch, a normally open switch, a normally closed switch, a light path interrupter, a capacitive sensor, or a proximity sensor.

In one embodiment, a gesture control device, such as 104, can be mechanically or electrically connected, or both, to a controller or computer processor, for example, as shown in FIG. 4. In any instance, the gesture control device can translate an indication of an input or command from a vehicle occupant to the controller or computer processor. One will recognize that various technologies can be used to facilitate translation of an indication of an input or command from a vehicle occupant to a controller or computer processor.

Figure 3C:
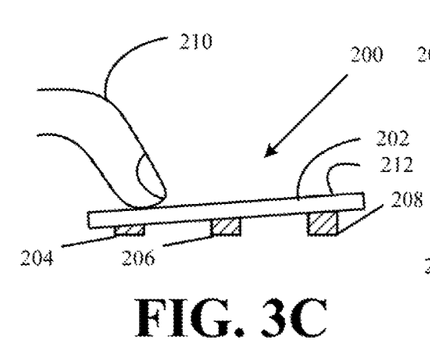
Figure 3D:
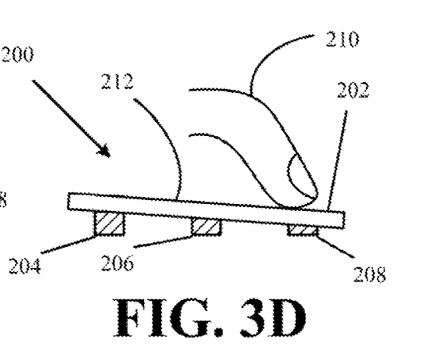
Figure 3E:
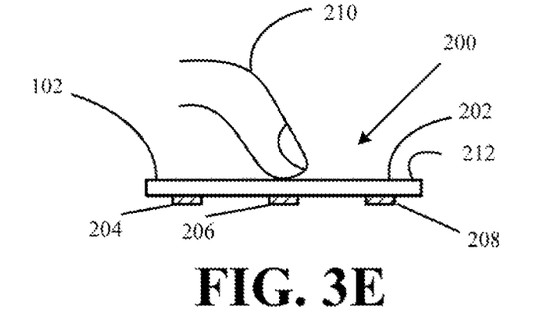

Turning back to FIGS. 3C-3E, these figures illustrate the rocker switch 200 being manipulated by a vehicle occupant in multiple positions to indicate a variety of inputs. In FIG. 3C, the vehicle occupant's finger 210 is shown pressing a lower portion of the rocker switch 200 to actuate a lower actuator 204. In FIG. 3D, the vehicle occupant's finger 210 is shown pressing an upper portion of the rocker switch 200 to actuate an upper actuator 208. In FIG. 3E, the vehicle occupant's finger 210 is shown pressing a central portion of the rocker switch 200 to actuate all three actuators 204, 206, 208. One will recognize that other embodiments of a gesture control device, such as a button or rocker switch, can exist, and that in certain embodiments, a gesture control device may be manipulated in a variety of positions by a vehicle occupant to indicate one or more inputs or commands as desired.

In other embodiments, a gesture control device, such as a button or rocker switch, can be accompanied by additional gesture control devices mounted on the steering column or wheel, or otherwise operating in conjunction with the gesture control device and mounted elsewhere within the vehicle. For example, a steering column may have two buttons, such as 104 as shown in FIGS. 1 and 2, functioning as gesture control devices. In another example, a steering column may have a single gesture control device, such as a button, operating in conjunction with a gesture detection device, such as a camera, with a field-of-view on or adjacent to the gesture control device for capturing images of a vehicle occupant's hand, such as a left hand, on or adjacent to the gesture control device.

Furthermore, in other embodiments, a gesture control device, such as button or a rocker switch, can be sequentially manipulated by a vehicle occupant to indicate an input, command, or series of inputs or commands. For example, a vehicle occupant may press an upper portion of a gesture control device, similar to the operation shown in FIG. 3D, three times in a row to input a particular command, such as a gesture learning command. In another example, a vehicle occupant may press an upper portion of a gesture control device, similar to the operation shown in FIG. 3D, once, and then press a lower portion of the gesture control device, similar to the operation shown in FIG. 3C, once, to input a particular command, such as an undo command, which may delete a prior stored gesture and/or may revert a current setting or function associated with the vehicle to a prior setting or function. One will recognize that various combinations of sequential manipulations can be programmed for a vehicle occupant to input any type of command or any number of commands.

In one embodiment, a gesture control device, such as a button or a rocker switch, can be used to indicate that one or more gestures are to be stitched together. That is, when a vehicle occupant indicates a start point and a stop point to a series of one or more gestures, the vehicle occupant can immediately indicate a start point and a stop point to a subsequent series of one or more gestures, and so on. In this manner, any number of series of one or more gestures can be stitched together to facilitate multiple inputs or commands for processing by a controller or computer processor, such as shown in FIG. 4.

In any instance, the inputs received via manipulation of the one or more gesture control devices, such as a button or a rocker switch 200 can be transmitted to at least one controller or computer processor associated with the vehicle, such as that shown in FIG. 4.

Thus, the illustrative gesture control arrangement 100 shown in FIGS. 1-2 can be implemented with a combination of the vehicle occupant's manipulation of a gesture control device 104, such as a button mounted on a steering column of the vehicle, and the detection of one or more occupant's gestures by a gesture detection device 106, such as a camera. Upon input of a gesture initiation indication, via a gesture control device by a vehicle occupant (for example, the occupant 114 of FIG. 1) using his or her left hand, the gesture detection device 106 can be activated to receive one or more gestures from the right hand of the vehicle occupant 114. Upon input of a gesture termination indication by the vehicle occupant 114, via a gesture control device 104 using his or her left hand, the gesture detection device 106 can cease receiving further gestures from the occupant 114, and the one or more gestures received by the gesture detection device 106 can be processed to select one or more commands to control corresponding functions associated with the vehicle.

In one embodiment, the gesture control arrangement 100 shown in FIGS. 1-2 can be used to store one or more vehicle preferences for subsequent retrieval. For example, a vehicle occupant may set one or more vehicle preferences in a state to be captured. That is, a vehicle occupant may desire the rear vehicle windows to be halfway down, the sunroof fully open, the driver side window down about one inch, and the front passenger side window down about one inch. After the vehicle occupant places the windows in this desired configuration, the vehicle occupant can manipulate a gesture control device, such as 104, to store or learn one or more gestures from the occupant. For example, a vehicle occupant can press a gesture control device, such as a button, three times in a row to initiate a pattern recognition module or computer program, similar to that shown in FIG. 4. In any instance, the gesture detection device, such as 106, can capture one or more hand gestures by the vehicle occupant, which will indicate a "do" command for the one or more vehicle preferences. The pattern recognition module or computer program can store the one or more vehicle preferences and the one or more hand gestures captured by the gesture detection device 106 for subsequent retrieval. Thus, later when the vehicle occupant manipulates a gesture control device 104 to initiate one or more gestures to be captured by the gesture detection device 106, a hand gesture associated with the "do" command can be executed by a controller or computer processor to move the vehicle windows to the desired vehicle preferences of the vehicle occupant. One will recognize that other gestures and commands can be stored according to other embodiments of the invention.

According to example embodiments, similar arrangements as those described above with reference to FIGS. 1-3 may utilize one or more gesture control devices, such as a button or rocker switch, or other input devices to receive a vehicle occupant's gesture initiation and termination indications. Further, similar arrangements, such as those described above with reference to FIGS. 1-3, may utilize a gesture detection device, such as a camera, or other input devices to detect gestures of the vehicle occupant, and may use the detected gestures to alter or control some aspect associated with the vehicle.

FIG. 4 is a block diagram of an illustrative gesture control system 400, according to an example embodiment of the invention. The gesture control system 400 can implement the gesture control arrangement 100 shown in FIG. 1. The system 400 may include a controller 402 that is in communication with one or more gesture control devices 403 and one or more gesture detection devices 404. Images from the one or more gesture detection devices 404 may be processed by the controller 402 and used to control or alter one or more devices 405A-405N associated with a vehicle. Typically, the one or more gesture control devices 403 can be associated with respective actuators that translate and communicate input from the one or more gesture control devices 403 to the controller 402. According to an example embodiment, the controller 402 includes a memory 406 in communication with one or more processors 407. The one or more processors 407 may communicate with the gesture control devices 403, gesture detection devices 404, and/or the devices 405A-405N via one or more input/output interfaces 408 and/or network interfaces 410.

In one embodiment, one or more processors can be configured to receive an initiation indication from at least one actuator; receive gesture information from at least one gesture detection device; receive a termination indication from at least one actuator; determine, from the received gesture information, a gesture from at least one occupant of the vehicle, wherein the gesture is determined based at least in part on the initiation indication; select a command from a plurality of commands, based at least in part on the determined gesture; and output a control signal or a command control signal associated with the command. According to an example embodiment, the one or more processors can be configured to output the control signal or a command control signal based at least in part on the received termination indication.

According to an example embodiment, one or more processors can be further configured to learn a new gesture, wherein learning the new gesture can include receiving a learn indication from the at least one actuator; determining a placement or tracking a movement path associated with at least one hand of an occupant in the vehicle, based at least in part on the learn indication; associating a command with determining the placement or tracking the movement; and storing at least a representation of the placement or movement and the associated command.

According to an example embodiment, at least one gesture detection device can include one or more of an image capture device, a touchpad, a switch, a proximity sensor, a light path interrupter, or a capacitive sensor. According to an example embodiment, the initiation and the termination indications can include, but are not limited to, one or more of a change in voltage, a change in current, or a change in light level from the at least one actuator, wherein the change is controlled at least in part by the occupant of the vehicle.

According to an example embodiment, determining a gesture can include determining a placement or tracking a movement path associated with at least one hand of an occupant of the vehicle.

According to an example embodiment, the plurality of commands can include, but are not limited to, vehicle control commands, climate control commands, audio system commands, window control commands, seat control commands, display control commands, web commands, share a gesture commands, or communications control commands.

As shown in the embodiment of FIG. 4, the memory 406 may include an operating system 412, data 414, and one or more modules that provide computer-readable code for configuring a processor to perform certain special functions. For example, the memory 406 may include an image processing module 416 or other image recognition functionality.

In one embodiment, an image processing module 416 can receive one or more hand gestures from a gesture detection device or camera, such as 106 in FIG. 1. The image processing module 416 can compare the one or more hand gestures with previously stored images of hand features and/or hand gestures, wherein some or all of the previously stored images can correspond to a respective command. For example, a previously stored image of a hand with an index finger up can correspond to opening a sunroof or moonroof of the vehicle. In one embodiment, an image processing module 416 can analyze multiple degrees of freedom, such as 6, of a captured image of a vehicle occupant's arm and/or hand. In one embodiment, an image processing module 416 can utilize a distance measure, or in some embodiments, a confidence measure, to compare captured hand gestures to previously stored images. In certain instances, a sequence or series of previously stored images can correspond with one or more commands. For example, a sequence of images of a first or closed hand in a first moving from a lower position to a higher position can correspond with respective commands to close all windows of the vehicle. One will recognize that various hand gestures and combinations of hand gestures can be captured and programmed to correspond to any type of command or any number of commands to the vehicle.

According to an example embodiment, an image processing module 416 may select a command from a plurality of commands, based at least in part on the determined gesture. In this example, there may be one or more previously stored commands associated with a previously stored gesture. Using contextual analysis and/or any other analytical processing, a command or input can be selected from the one or more previously stored commands.

According to an example embodiment, the memory 406 may include a pattern recognition module 418 or other learning functionality. The pattern recognition module 418, for example, may work in conjunction with the image processing module 416, and may be utilized for locating and tracking features in the captured and processed images. In an example embodiment, the pattern recognition module 418 may be utilized for learning one or more hand gestures of a vehicle occupant. For example, a user may perform a series of sequential gestures with his or her right hand. The relative altitude, rotation, and/or configuration of the vehicle occupant's hand may be determined and stored for subsequent retrieval and/or comparison according to an example embodiment. If one or more vehicle preferences or a specific input or command is associated with the one or more hand gestures, the vehicle preferences, specific inputs or commands, and associated hand gestures can be stored by the image processing module 416 and/or the pattern recognition module 418.

In accordance with an example embodiment, the memory 406 may include an interpretation/output module 420 or other response functionality that may provide inputs, commands, or other information to the devices 405A-405N based at least on the determination of one or more gestures. For example, the interpretation/output module 420 can generate or otherwise output a control signal or a command control signal associated with a command to one or more devices, such as 405A-405N, associated with a vehicle. In example embodiments, inputs, commands, or other information may include, but are not limited to, vehicle control functions such as vehicle control commands, climate control commands, audio system commands, window control commands, seat control commands, display control commands, web commands, and communications control commands, and may be determined, at least in part, by the image processing module 416.

According to an example embodiment, the controller 402 may include one or more network interfaces 410 for providing communications between the controller 402 and a remote server 422 via a wireless network 424. According to example embodiments, the remote server 422 may be used for gathering information and/or for providing software or firmware updates to the controller 402 as needed.

As desired, other embodiments of the invention may include the gesture control system 400 with more or less of the components illustrated in FIG. 4.

Figure 5:
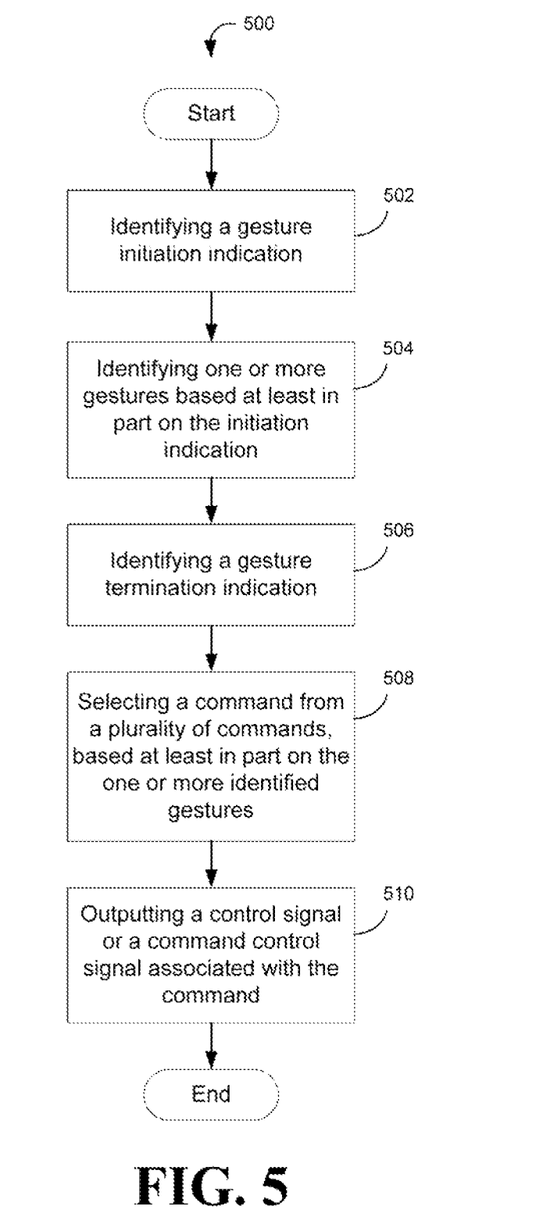
FIG. 5 is a flow diagram of an example method, according to an example embodiment of the invention.

An example method 500 for controlling one or more devices attached to a vehicle based at least in part on a detected direction of observation of an occupant of the vehicle will now be described with reference to the flow diagram of FIG. 5. The method 500 can be implemented by the gesture control arrangement 100 shown in FIG. 1 and/or the gesture control system 400 shown in FIG. 4.

The method 500 starts in block 502, and according to an example embodiment of the invention, can include identifying a gesture initiation indication. In block 504, the method 500 can include identifying; one or more gestures based at least in part on the initiation indication. In block 506, the method 500 can include identifying a gesture termination indication. In block 508, the method 500 can include selecting a command from a plurality of commands, based at least in part on the one or more identified gestures. In block 510, the method 500 can include outputting a control signal or a command control signal associated with the command. The method 500 can end after block 510.

According to an example embodiment, identifying the one or more gestures can include receiving and processing one or more images obtained from an image capture device. In an example embodiment, locating the one or more body features comprises locating one or more eyes associated with the occupant. According to an example embodiment, outputting the control signal or the command control signal can be based at least in part on the identifying the gesture termination indication.

The following example may provide additional details for utilizing command initiation and/or termination, according to an example embodiment of the invention. In an example scenario, a user may desire to open the sun roof on the vehicle, in an example embodiment, there may be no control buttons in the car's roof, for example, so that a driver does not need to look upwards and take his or her eyes of the road. In an example embodiment, the user may press one of the gesture control devices 104, (for example, the button marked "PTTG1" as shown in FIG. 1 or 2) with their left thumb to indicate the initiation of a gesture. The user may then gesture approximately to the sunroof with their right hand, and the sunroof may start to open. According to an example embodiment, the combination of the button press with the gesture may be utilized to establish an association between the gesture and the gesture control device 104, i.e., the button. In an example embodiment, the user may then drop their right hand while continuing to press the button and the sunroof may continue to open because the button association with the gesture has been established. In an example embodiment, the user may, release their left thumb from the button and the sunroof may stop opening. In this embodiment, the release of the button may be considered to be the gesture termination. According to an example embodiment, the button/gesture association may remain active for a few seconds (or other predetermined amount of time), for example, so that the user may utilize the button to fine adjust the position of the sun roof. For example, the gesture control devices 104 may be rocker-type buttons that may have several actuation positions, as indicated in FIGS. 3A-3E, and the sun roof may move forward while the top edge of the button is pressed. According to an example embodiment, after a predetermined time, the association with the button may go back to a predetermined state so that a particular gesture, in combination with the button press, may be used for association and control.

According to an example embodiment, identifying one or more of the gesture initiation indication or the gesture termination indication can include detecting one or more of a change in voltage, a change in current, or a change in light level from at least one actuator attached to the vehicle, wherein the change is controlled at least in part by an occupant of a vehicle. According to an example embodiment, identifying one or more of the gesture initiation indication or the gesture termination indication can include receiving the indication from a push button that can include, but is not limited to, a switch, a momentary switch, a normally open switch, a normally closed switch, a light path interrupter, a capacitive sensor, or a proximity sensor. According to an example embodiment, identifying the one or more gestures can include determining a placement or tracking a movement path associated with at least one hand of an occupant of a vehicle.

In another embodiment, the method can further include learning a new gesture. In an example embodiment, learning the new gesture can include identifying a learn indication; determining a placement or tracking a movement path associated with at least one hand of an occupant of a vehicle, based at least in part on the learn indication; associating a command with the determining the placement or tracking the movement; and storing at least a representation of the placement or movement and the associated command.

According to an example embodiment, the plurality of commands can include, but are not limited to, vehicle control commands, climate control commands, audio system commands, window control commands, seat control commands, display control commands, web commands, share a gesture command, or communications control commands.

According to example embodiments, certain technical effects can be provided, such as creating certain systems, methods, and apparatus that detect gesture initiation and termination by a user in a vehicle and controlling devices in the vehicle based on the user's gestures. Example embodiments of the invention can provide the further technical effects of providing systems, methods, and apparatus for storing, learning, and implementing vehicle control commands without requiring a vehicle driver to look away from the area ahead of the vehicle.

In example embodiments of the invention, the gesture control system 400 may include any number of hardware and/or software applications that are executed to facilitate any of the operations. In example embodiments, one or more input/output interfaces may facilitate communication between the gesture control system 400 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the gesture control system 400. The one or more input/output interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the gesture control system 400 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network, any wired network, any wireless network, etc., for communication with external devices and/or systems.

Certain embodiments of the invention are described above with reference to block and flow diagrams of systems and methods and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments. It is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A vehicle comprising:
   at least one button;
   at least one gesture detection device configured to detect gestures when an object enters a field of view; and
   one or more processors configured to:
      detect a hand gesture within the field of view of the at least one gesture detection device;
      receive a button push-from the at least one button, wherein the at least one button is configured to be manipulated by a hand of an occupant of the vehicle, and wherein the hand gesture precedes the button push;
      determine, based at least in part on the hand gesture in addition to the button push, that at least the hand gesture is to be translated into a command;
      receive gesture information associated with at least the hand gesture from the at least one gesture detection device;
      determine, from the gesture information, the hand gesture;
      select the command based at least in part on the hand gesture; and
      output at least one control signal or at least one command control signal associated with the command.

2. The vehicle of claim 1, wherein the at least one gesture detection device comprises one or more of an image capture device, a touchpad, a switch, a proximity sensor, a light path interrupter, or a capacitive sensor.

3. The vehicle of claim 1, wherein the one or more processors are further configured to receive a termination indication from the at least one button, and wherein to output the at least one control signal or the at least one command control signal comprises to output based at least in part on the termination indication.

4. The vehicle of claim 3, wherein the button push and the termination indication comprise one or more of a change in voltage, a change in current, or a change in light level from the at least one button, wherein the change is controlled at least in part by the occupant of the vehicle.

5. The vehicle of claim 1, wherein the at least one button comprises one or more of a touch sensitive switch, a toggle switch, a momentary switch, a normally open switch, a normally closed switch, a light path interrupter, a capacitive sensor, or a proximity sensor.

6. The vehicle of claim 1, wherein to determine the second hand gesture comprises to determine a placement or to track a movement path associated with the hand.

7. The vehicle of claim 1, wherein the one or more processors are further configured to learn a new gesture, wherein to learn the new gesture comprises to:
   receive a learn indication from the at least one button;
   determine a placement or track a movement path associated with the hand, based at least in part on the learn indication;
   associate a second command with the placement or the movement path; and
   store at least a representation of the placement or the movement path and the second command.

8. The vehicle of claim 1, wherein the command is selected from among one or more of vehicle control commands, climate control commands, audio system commands, window control commands, seat control commands, display control commands, web commands, share a gesture commands, or communications control commands.

9. The vehicle of claim 1, wherein the one or more processors are further configured to detect, after the button push, a second hand gesture within the field of view of the at least one gesture detection device, wherein the gesture information is associated with at least the hand gesture and the second hand gesture.

10. An apparatus comprising:
    one or more processors configured to:
       detect a hand gesture within a field of view of at least one gesture detection device;
       receive a button push from at least one button, wherein the at least one button is configured to be manipulated by a hand of an occupant of a vehicle, and wherein the hand gesture precedes the button push;
       determine, based at least in part on the hand gesture in addition to the button push, that at least the hand gesture is to be translated into a command;
       receive gesture information associated with at least the hand gesture from the at least one gesture detection device;
       determine, from the gesture information, the hand gesture;
       select the command based at least in part on the hand gesture; and
       output at least one control signal or at least one command control signal associated with the command.

11. The apparatus of claim 10, wherein the at least one gesture detection device comprises one or more of an image capture device, a touchpad, a switch, a proximity sensor, a light path interrupter, or a capacitive sensor.

12. The apparatus of claim 10, wherein the one or more processors are further configured to receive a termination indication from the at least one button, and wherein to output the at least one control signal or the at least one command control signal comprises to output based at least in part on the termination indication.

13. The apparatus of claim 12, wherein one or more of the button push or the termination indication comprises one or more of a change in voltage, a change in current, or a change in light level from the at least one button attached to a vehicle, wherein the change is controlled at least in part by the occupant of the vehicle.

14. The apparatus of claim 10, wherein the at least one button comprises one or more of a touch sensitive switch, a toggle switch, a momentary switch, a normally open switch, a normally closed switch, a light path interrupter, a capacitive sensor, or a proximity sensor.

15. The apparatus of claim 10, wherein to determine the hand gesture comprises to determine a placement or to track a movement path associated with the hand.

16. The apparatus of claim 10, wherein the one or more processors are further configured to learn a new gesture, wherein to learn the new gesture comprises to:
   receive a learn indication from the at least one button;
   determine a placement or track a movement path associated with the hand based at least in part on the learn indication;
   associate a second command with the placement or the movement path; and
   store at least a representation of the placement or the movement path and the second command.

17. The apparatus of claim 10, wherein the command is selected from among one or more of vehicle control commands, climate control commands, audio system commands, window control commands, seal control commands, display control commands, web commands, share gesture commands, or communications control commands.

18. One or more non-transitory computer-readable media comprising computer-executable instructions that, when executed by one or more processors, configure the one or more processors to:
   detect a hand gesture within a field of view of at least one gesture detection device;
   receive a button push from at least one button, wherein the at least one button is configured to be manipulated by a hand of an occupant of a vehicle, and wherein the hand gesture precedes the button push;
   determine, based at least in part on the hand gesture in addition to the button push, that at least the hand gesture is to be translated into a command;
   receive gesture information associated with at least the hand gesture from the at least one gesture detection device;
   determine, from the gesture information, the hand gesture;
   select the command based at least in part on the hand gesture; and
   output at least one control signal or at least one command control signal associated with the command.

19. The non-transitory computer-readable media of claim 18, wherein the instructions further configure the one or more processors to receive a termination indication from the at least one button, and wherein to output the at least one control signal or the at least one command control signal comprises to output based at least in part on the termination indication.

20. The non-transitory computer-readable media of claim 18, wherein the at least one button comprises one or more of a touch sensitive switch, a toggle switch, a momentary switch, a normally open switch, a normally closed switch, a light path interrupter, a capacitive sensor, or a proximity sensor.

21. The non-transitory computer-readable media of claim 18, wherein the instructions further configure the one or more processors to learn a new gesture, wherein to learn the new gesture comprises to:
   receive a learn indication from the at least one button;
   determine a placement or track a movement path associated with the hand of the occupant of the vehicle, based at least in part on the learn indication;
   associate a second command with the placement or the movement path; and
   store at least a representation of the placement or the movement path and the second command.

22. The non-transitory computer-readable media of claim 18, wherein the command is selected from among one or more of vehicle control commands, climate control commands, audio system commands, window control commands, seat control commands, display control commands, web commands, share gesture commands, or communications control commands.

23. A method comprising executing computer-executable instructions by one or more processors, the method further comprising:
   detecting a hand gesture within a field of view of at least one gesture detection device;
   identifying a button push from at least one button, wherein the at least one button is configured to be manipulated by a hand of an occupant of a vehicle, and wherein the hand gesture precedes the button push;
   determining, based at least in part on the hand gesture in addition to the button push, that at least the hand gesture is to be translated into a command;
   identifying gesture information associated with at least the hand gesture, based at least in part on detecting the hand gesture;
   determining, from the gesture information, the hand gesture;
   selecting the command from a plurality of commands, based at least in part on the hand gesture; and
   outputting at least one control signal or at least one command control signal associated with the command.

24. The method of claim 23, further comprising receiving and processing one or more images obtained from an image capture device.

25. The method of claim 23, further comprising identifying a gesture termination indication by receiving an indication from the at least one button, wherein outputting the at least one control signal or the at least one command control signal is based at least in part on the identifying of the gesture termination indication.

26. The method of claim 25, wherein identifying one or more of the button push or the gesture termination indication comprises detecting one or more of a change in voltage, a change in current, or a change in light level from the at least one button attached to the vehicle, wherein the change is controlled at least in part by the occupant of the vehicle.

27. The method of claim 25, wherein identifying one or more of the button push or the gesture termination indication comprises receiving the indication from a push button comprising one or more of a switch, a momentary switch, a normally open switch, a normally closed switch, a light path interrupter, a capacitive sensor, or a proximity sensor.

28. The method of claim 23, wherein detecting the hand gesture comprises determining a placement or tracking a movement path associated with the hand.

29. The method of claim 23, further comprising learning a new gesture, wherein learning the new gesture comprises:
   identifying a learn indication;
   determining a placement or tracking a movement path associated with the hand based at least in part on the learn indication;
   associating a second command with the placement or the movement path; and
   storing at least a representation of the placement or the movement path and the second command.

30. The method of claim 23, wherein the command is selected from among one or more of vehicle control commands, climate control commands, audio system commands, window control commands, seat control commands, display control commands, web commands, share a gesture commands, or communications control commands.

\* \* \* \* \*